United States Patent
Chang

(10) Patent No.: US 6,510,117 B2
(45) Date of Patent: Jan. 21, 2003

(54) WRITING STRATEGY FOR CD-RW

(75) Inventor: Yung-Yu Chang, Taipei (TW)

(73) Assignee: Lite-On It Corporation, Taipei (TW)

( * ) Notice: Subject to any disclaimer, the term of this patent is extended or adjusted under 35 U.S.C. 154(b) by 110 days.

(21) Appl. No.: 09/755,063

(22) Filed: Jan. 8, 2001

(65) Prior Publication Data

US 2002/0126611 A1 Sep. 12, 2002

(51) Int. Cl.⁷ .................................................. G11B 5/76
(52) U.S. Cl. ............................... 369/59.13; 369/47.51; 369/53.13
(58) Field of Search .............................. 369/47.5, 47.51, 369/47.55, 53.26, 53.29, 59.12, 59.13, 116, 47.28, 53.12, 53.13, 53.31, 53.34, 53.37

(56) References Cited

U.S. PATENT DOCUMENTS 4,937,809 A * 6/1990 Miyadera et al. ........... 369/116

* cited by examiner

*Primary Examiner*—Paul W. Huber
(74) *Attorney, Agent, or Firm*—Rosenberg, Klein & Lee

(57) ABSTRACT

An improved writing strategy for constant angular velocity writing of CD-RW (compact disk-rewritable media) uses similar strategy as the constant linear velocity writing mode. The writing strategy includes the steps of dividing the compact disk into annular regions, setting a laser duty ratio for one of the regions, setting a laser write pulse duration to establish the laser duty ratio, and setting the laser duty ratios of the remaining annular regions using the same laser write pulse duration in each region. If the writing strategy results in unacceptable performance, as by laser write jitter being out of tolerance, the laser write pulse duration may be slightly modified in selected areas to acquire the desired performance level.

5 Claims, 1 Drawing Sheet

WRITING STRATEGY FOR CD-RW

FIELD OF THE INVENTION

The present invention relates to an improved writing strategy for CD-RW, especially to an improved writing strategy for CAV (constant angular velocity) writing of CD-RW.

BACKGROUND OF THE INVENTION

The writing strategy is important issue for CD-RW (compact disc rewritable), which is applied to renew, establish and store video and audio data. The CD-RW standards were developed to allow writing, erasing and rewriting data on various rewritable optical disk media. Thus, a CD-RW system should have a suitable writing strategy so as to be compatible with various rewritable optical disks made by different manufacturers.

In the CLV (constant linear velocity) writing mode, the writing speed is kept constant for both the inner radius and the outer radius of the optical disk. When a rewritable optical disk is placed into the CD-RW drive, a fixed duty ratio is set for the inner radius and outer radius of the optical disk. Afterward, the jitter values for various writing speeds are measured by a certain instrument to ensure the jitter values are below a threshold (for example, 35). The writing strategy for each writing speed of the CD-RW can be optimized in this way.

However, for the CAV (constant angular velocity) writing mode of the CD-RW, the writing speed is varied linearly from inner radius of the disk to the outer radius of the disk. For example, if the writing speed for inner radius is 4× speed, the writing speed at the center radius is 8× speed and the writing speed at the outer radius may be 10× speed. When the rewritable optical disk is placed into a CD-RW system with CAV writing mode, the duty ratios for 4×, 8× and 10× writing speeds are set, respectively. Afterward, the jitter values for those writing speeds are measured to ensure the jitter values are within tolerance. However, the duty ratios for each region are often determined after repeated measurement. Thus, the optical disk is segmented into several regions of equivalent writing speed and then the writing strategy is optimized for each of those intervals. This approach is complicated and time consuming for CD-RW manufacturers, especially since the writing strategy may have to be modified for rewritable optical disks of different manufacturers.

SUMMARY OF THE INVENTION

It is the object of the present invention to provide an improved writing strategy for CAV writing of CD-RW media, which uses similar strategy as the CLV writing mode.

To achieve the above object, the present invention provides an improved writing strategy for CAV (constant angular velocity) writing of CD-RW media. First, a duty ratio is set and then a laser writing pulse duration is determined for this duty ratio. Afterward, the duty ratios for various writing speeds are deduced from the laser writing pulse duration.

The various objects and advantages of the present invention will be more readily understood from the following detailed description when read in conjunction with the appended drawing, in which:

DETAILED DESCRIPTION OF THE INVENTION

Figure 1A:
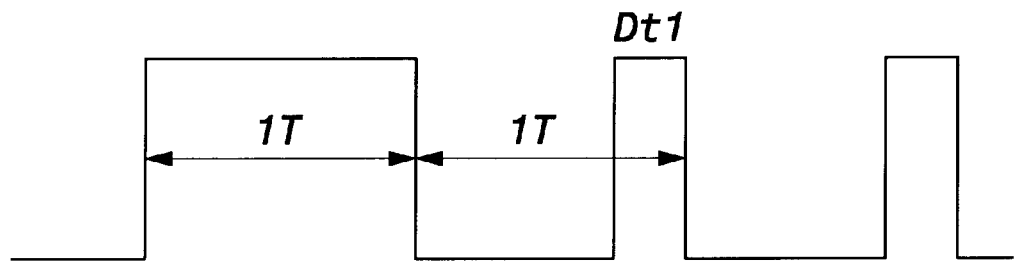
FIG. 1A is the timing diagram for 4× writing strategy.
Figure 1B:
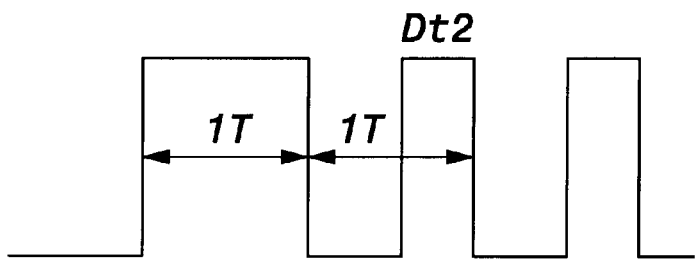
FIG. 1B is the timing diagram for 8× writing strategy.
Figure 1C:
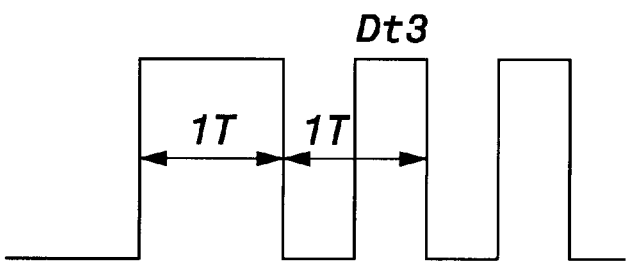
FIG. 1C is the timing diagram for 10× writing strategy.

FIGS. 1A, 1B and 1C are the timing diagram for 4×, 8×, and 10× writing strategy, respectively. At 1× speed, $1T=1/(4.3128\times10^6)=231.385$ ns, wherein $4.3128\times10^6$ is bit rate of the optical disk. Then, at 4× speed, $1T=1/(4.3128\times10^{6\times4})=57.85$ ns;

at 8× speed, $1T=1/(4.3128\times10^{6\times8})=28.92$ ns;

at 10× speed, $1T=1/(4.3128\times10^{6\times10})=23.14$ ns.

The corresponding duty ratios are:

at 4× speed, duty ratio=Dt1/1T=Dt1/57.85;

at 8× speed, duty ratio=Dt2/1T=Dt2/28.92;

at 10× speed, duty ratio=Dt3/1T=Dt3/23.14.

The above-mentioned Dt1, Dt1 and Dt3 are laser writing pulse durations, i.e., the duration that the laser is emitting to write data at those speeds. In such a system, the parameters Dt1, Dt2 and Dt3 are precisely adjusted. In the present invention, however, a specific duty ratio is set and then a corresponding laser writing pulse duration is established. In other words, the duty ratio at 4× speed is set initially and then the laser writing pulse duration Dt1 at 4× speed is set. Afterward, the Dt2 and Dt3 are set to be equal to Dt1, i.e., Dt1=Dt2=Dt3. The laser writing pulse duration is fixed for all writing speeds, thus simplifying the writing strategy for the CD-RW system. The duty ratios are then:

at 4× speed, duty ratio=Dt1/1T=Dt1/57.85;

at 8× speed, duty ratio=Dt2/1T=Dt2/28.92;

at 10× speed, duty ratio=Dt3/1 T=Dt3/23.14.

In the writing strategy of the present invention, the laser writing pulse duration Dt1, Dt2, and Dt3 are independent of writing speed. The writing strategy of CD-RW is then simplified while the jitter values are satisfactory, as shown in the following table.

| Writing speed | tilt | 3T | 4T | 5T | 6T | 7T | 8T | 9T | 10T | 11T |
|---|---|---|---|---|---|---|---|---|---|---|
| 4× | Pit jitter | 27.6 | 28.6 | 27.8 | 27.4 | 29 | 29.2 | 30 | 30.4 | 30.2 |
|  | Land jitter | 18.4 | 26.8 | 18 | 20.4 | 21.6 | 22.6 | 22.4 | 23.4 | 26.2 |
| 8× | Pit jitter | 20.8 | 20.2 | 19.8 | 20.2 | 19.8 | 20.8 | 20.6 | 21 | 22 |
|  | Land jitter | 18 | 19.6 | 19.8 | 19.6 | 19.4 | 20.8 | 20.4 | 20.6 | 23.8 |

-continued

| Writing speed | tilt | 3T | 4T | 5T | 6T | 7T | 8T | 9T | 10T | 11T |
|---|---|---|---|---|---|---|---|---|---|---|
| 10× | Pit jitter | 26.8 | 25.4 | 24.8 | 25.6 | 25.4 | 26 | 27.4 | 26.8 | 26.4 |
|  | Land jitter | 18.8 | 22.4 | 28.4 | 23.6 | 24.4 | 25.2 | 26 | 25.2 | 28.4 |

Moreover, in the above case, the parameter Dt1 should be globally optimized with respect to jitter over the entire optical disk. However, if a global optimal value of Dt1 cannot be found, the disk is segmented into several virtual intervals and a local optimal value of laser writing pulse duration is searched for each interval. For example, if the writing speed interval 4×–6× speed has laser writing pulse duration Dt1, the writing speed interval 7×–10× speed could have laser writing pulse duration Dt1, where the difference between Dt1 and Dt2 is small. In other words, the laser writing pulse duration in one writing speed interval has some value, and the laser writing pulse duration in another writing speed interval is slightly different. In this case, the duty ratios now are:

at 4× speed, duty ratio=Dt1/57.85;

at 6× speed, duty ratio=Dt1/38.56;

at 8× speed, duty ratio=Dt2/28.92;

at 10× speed, duty ratio=Dt2/23.14.

By this writing strategy, the jitter values are also quite satisfactory.

To sum up, the present invention provides a writing strategy for CD-RW media, whereby the writing strategy for CAV writing of CD-RW media is simplified.

Although the present invention has been described with reference to the preferred embodiment, it will be understood that the invention is not limited to the details thereof. Various substitutions and modification shave been suggested in the foregoing description, and others will occur to those of ordinary skill in the art. Therefore, all such substitutions and modifications are intended to be embraced within the scope of the invention as defined in the appended Claims.

I claim:

1. A method for constant-angular-velocity writing of a rewritable compact disk, the method comprising the steps of:

(a) dividing the rewritable compact disk into a plurality of annular regions;

(b) assigning each of said plurality of annular regions with a corresponding write speed;

(c) assigning one of said plurality of annular regions a laser duty ratio;

(d) setting a laser write pulse duration such that said laser duty ratio is established; and (e) setting a local laser duty ratio in each of remaining ones of said plurality of annular regions using said laser write pulse duration such that said corresponding write speed in said each of said remaining ones of said plurality of annular regions is maintained.

2. The method as recited in claim 1, wherein said one of said plurality of annular regions in step (c) is one of said plurality of annular regions assigned a minimum corresponding write speed in step (b).

3. The method as recited in claim 1, further comprising the steps of:

(f) measuring a performance parameter at predetermined locations on the rewritable compact disk;

(g) performing steps (h) and (i) if said performance parameter does not meet predetermined criteria;

(h) dividing the rewritable compact disk into a plurality of virtual annular regions; and, (i) adjusting said laser write pulse duration in each of said plurality of virtual annular regions so that said performance parameter meets said predetermined criteria therein.

4. The method as recited in claim 3, wherein said performance parameter is pit jitter.

5. The method as recited in claim 3, wherein said performance parameter is land jitter.

* * * * *